US009053087B2

(12) United States Patent
Levit et al.

(10) Patent No.: US 9,053,087 B2
(45) Date of Patent: Jun. 9, 2015

(54) AUTOMATIC SEMANTIC EVALUATION OF SPEECH RECOGNITION RESULTS

(75) Inventors: Michael Levit, San Jose, CA (US);
Shuangyu Chang, Fremont, CA (US);
Bruce Melvin Buntschuh, Mountain View, CA (US); Nick Kibre, Redwood City, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 230 days.

(21) Appl. No.: 13/243,098

(22) Filed: Sep. 23, 2011

(65) Prior Publication Data

US 2013/0080150 A1    Mar. 28, 2013

(51) Int. Cl.
| | | |
|---|---|---|
| *G06F 7/00* | (2006.01) | |
| *G06F 17/00* | (2006.01) | |
| *G06F 17/30* | (2006.01) | |
| *G06F 3/00* | (2006.01) | |
| *G06F 17/27* | (2006.01) | |
| *G10L 15/00* | (2013.01) | |
| *G10L 15/26* | (2006.01) | |
| *G10L 15/06* | (2013.01) | |
| *G10L 15/01* | (2013.01) | |
| *G10L 15/18* | (2013.01) | |

(52) U.S. Cl.
CPC ........... *G06F 17/273* (2013.01); *G10L 15/1815* (2013.01); *G10L 15/01* (2013.01); *G10L 15/26* (2013.01)

(58) Field of Classification Search
CPC ................... G06F 17/30864; G06F 17/30463; G06F 17/30867; G06F 7/24; H04L 29/0809; G10L 25/87

USPC ............ 704/9, 10, 238, 235, 251, 270.1, 257, 704/252, 215, 255, 275; 707/706, 723, 732, 707/707, 759, 708, 705, 754, 713, 728, 722, 707/758, 715
See application file for complete search history.

(56) References Cited

U.S. PATENT DOCUMENTS

| | | | | |
|---|---|---|---|---|
| 6,311,182 | B1 * | 10/2001 | Colbath et al. | 704/246 |
| 7,133,863 | B2 * | 11/2006 | Teng et al. | 707/708 |
| 7,219,090 | B2 * | 5/2007 | Travis, Jr. | 1/1 |
| 7,401,023 | B1 * | 7/2008 | Schwartz et al. | 704/275 |
| 7,752,195 | B1 * | 7/2010 | Hohwald et al. | 707/715 |
| 7,797,635 | B1 * | 9/2010 | Denise | 715/738 |
| 7,818,314 | B2 * | 10/2010 | Chowdhury et al. | 707/722 |
| 7,890,503 | B2 * | 2/2011 | Murarka et al. | 707/728 |
| 7,912,847 | B2 * | 3/2011 | Lagad et al. | 707/758 |
| 7,984,039 | B2 * | 7/2011 | Carmel et al. | 707/713 |
| 7,991,780 | B1 * | 8/2011 | Anderson et al. | 707/754 |

(Continued)

OTHER PUBLICATIONS

Levit, et al., Article entitled, "Garbage Modeling with Decoys for a Sequential Recognition Scenario," published 2009 at the IEEE, ASRU Convention; pp. 468-473; 6 pages.

(Continued)

*Primary Examiner* — Pierre-Louis Desir
*Assistant Examiner* — Anne Thomas-Homescu
(74) *Attorney, Agent, or Firm* — Steven Spellman; Jim Ross; Micky Minhas (57) ABSTRACT

A semantic error rate calculation may be provided. After receiving a spoken query from a user, the spoken query may be converted to text according to a first speech recognition hypothesis. A plurality of results associated with the converted query may be received and compared to a second plurality of results associated with the converted query.

20 Claims, 3 Drawing Sheets

(56) References Cited

U.S. PATENT DOCUMENTS

| | | | |
|---|---|---|---|
| 8,103,667 B2* | 1/2012 | Azar et al. | 707/732 |
| 8,108,375 B2* | 1/2012 | Barsness et al. | 707/705 |
| 8,135,698 B2* | 3/2012 | Dettinger et al. | 707/708 |
| 8,150,843 B2* | 4/2012 | Chitiveli et al. | 707/723 |
| 8,364,664 B2* | 1/2013 | Bennett | 707/722 |
| 8,423,541 B1* | 4/2013 | Baluja et al. | 707/732 |
| 8,463,799 B2* | 6/2013 | Davis et al. | 707/752 |
| 2003/0041054 A1* | 2/2003 | Mao et al. | 707/3 |
| 2004/0138885 A1 | 7/2004 | Lin | |
| 2004/0220907 A1* | 11/2004 | Camarillo | 707/3 |
| 2005/0038775 A1* | 2/2005 | Haveliwala et al. | 707/3 |
| 2005/0222981 A1* | 10/2005 | Lawrence et al. | 707/3 |
| 2006/0242130 A1* | 10/2006 | Sadri et al. | 707/3 |
| 2007/0022125 A1* | 1/2007 | Salam et al. | 707/100 |
| 2007/0078822 A1* | 4/2007 | Cucerzan et al. | 707/3 |
| 2007/0162442 A1* | 7/2007 | Brill et al. | 707/5 |
| 2007/0203887 A1* | 8/2007 | Dynin | 707/3 |
| 2008/0071533 A1 | 3/2008 | Cave et al. | |
| 2009/0037175 A1 | 2/2009 | Wang et al. | |
| 2009/0089277 A1* | 4/2009 | Cheslow | 707/5 |
| 2009/0100042 A1* | 4/2009 | Qiao | 707/5 |
| 2009/0157652 A1* | 6/2009 | Barbosa et al. | 707/5 |
| 2009/0282023 A1* | 11/2009 | Bennett | 707/5 |
| 2009/0327224 A1* | 12/2009 | White et al. | 707/3 |
| 2010/0106703 A1* | 4/2010 | Cramer | 707/706 |
| 2010/0198837 A1* | 8/2010 | Wu et al. | 707/748 |
| 2010/0223250 A1* | 9/2010 | Guha | 707/706 |
| 2010/0241624 A1* | 9/2010 | Ramsey | 707/732 |
| 2010/0257164 A1* | 10/2010 | Halverson et al. | 707/725 |
| 2010/0306205 A1* | 12/2010 | Sun et al. | 707/752 |
| 2010/0306213 A1* | 12/2010 | Taylor et al. | 707/759 |
| 2011/0004609 A1* | 1/2011 | Chitiveli et al. | 707/759 |
| 2011/0071826 A1 | 3/2011 | Ma et al. | |
| 2011/0106617 A1* | 5/2011 | Cooper et al. | 705/14.49 |
| 2011/0145214 A1* | 6/2011 | Zhang et al. | 707/706 |
| 2011/0153324 A1* | 6/2011 | Ballinger et al. | 704/235 |
| 2012/0005186 A1* | 1/2012 | Monteverde | 707/707 |
| 2012/0096000 A1* | 4/2012 | Azar et al. | 707/732 |
| 2012/0221560 A1* | 8/2012 | Chevalier et al. | 707/723 |
| 2012/0323905 A1* | 12/2012 | Qiao | 707/723 |
| 2012/0330948 A1* | 12/2012 | Rault et al. | 707/728 |
| 2013/0060769 A1* | 3/2013 | Pereg et al. | 707/728 |
| 2013/0086024 A1* | 4/2013 | Liu et al. | 707/706 |
| 2013/0166529 A1* | 6/2013 | Shuster | 707/706 |
| 2013/0254177 A1* | 9/2013 | Davlos et al. | 707/706 |
| 2014/0278390 A1* | 9/2014 | Kingsbury et al. | 704/232 |

OTHER PUBLICATIONS

Franz, et al., Abstract entitled "Searching the Web by Voice," retrieved Jul. 14, 2011; 5 pages.

* cited by examiner

AUTOMATIC SEMANTIC EVALUATION OF SPEECH RECOGNITION RESULTS

BACKGROUND

Semantic error rate metrics may be used to evaluate recognition success in a speech recognition algorithm. In traditional models, domain-independent metrics such as word error rate and sentence error rate may be used to measure the accuracy of a speech recognition system. These metrics, however, do not provide any insight into the accuracy of a recognition algorithm when the speech is tied to a particular domain, such as may be needed when comparing alternative algorithms for a specific application.

SUMMARY

This Summary is provided to introduce a selection of concepts in a simplified form that are further described below in the Detailed Description. This Summary is not intended to identify key features or essential features of the claimed subject matter. Nor is this Summary intended to be used to limit the claimed subject matter's scope.

A semantic error rate calculation may be provided. After receiving a spoken query from a user, the spoken query may be converted to text according to a first speech recognition hypothesis. A plurality of results associated with the converted query may be received and compared to a second plurality of results associated with the converted query.

Both the foregoing general description and the following detailed description provide examples and are explanatory only. Accordingly, the foregoing general description and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention.

To evaluate speech recognition with respect to search success, search results obtained for the user's actual query (e.g. as transcribed by human annotators) may be compared with the search results obtained for the automatic transcription of this query produced by the automatic speech recognition (ASR) algorithm to be analyzed/evaluated. Several alternative metrics may be employed, such as recall and/or precision based metrics computed on titles and descriptions of the two sets of respective search results. As an extension of the approach, this metric may be combined with another criterion that may predict whether the recognition result is "good enough" to let the search engine process it. The new recognition figure-of-merit may serve as a criterion to select a superior ASR as well as an objective for future improvements.

A semantic error rate may be defined in terms of two sets of search results produced for different recognition hypotheses for a given spoken utterance. The semantic error rate may be expressed in terms of a number of factors that can be computed in terms of precision and recall metrics defined on paired sets of data resulting from two sets of search results, each associated with a different recognition hypothesis. For example, when ASR is performed on a web search query, sets such as titles, summaries, and/or full contents of resulting websites may be compared between the different hypotheses.

As an example, 10 search results may be compared for results from two ASR algorithms and the recall metric on titles can be computed as follows. For all titles of webpages in the set of search results for query's first transcription, see if a webpage with the same title occurs in the set of search results for the second query's recognition. If so, compute the rank difference for this webpage in the two sets and normalize it appropriately. Sum these rank differences across all titles in the first set, weighting individual webpages according to their ranks in this set. To compute a precision metric, swap the two sets. Similar measures may be produced at the word n-gram level for titles, but also for summaries and/or full contents. Overall, this comparative algorithm will produce a number of factors that may be used to derive a semantic error rate.

The exact way of combining such factors into a formally defined semantic error rate may be learned with a statistical learning system. During training, this system may be presented with a number of training queries, along with the corresponding sets of factors above and predefined correctness measures, such as may be suggested by human annotators who visually inspected search results and/or an automated annotation system. In the targeted experimental environment, the learning system may be presented with the factor sets as derived for pairs of transcriptions/recognition-hypotheses, and the learning system may automatically estimate semantic error rate for each pair.

In addition to the search result-based reference labels from the annotators, a parallel statistical learning system may be trained with reference labels coming from labelers who analyze the speech recognition and manual transcriptions and then decide whether the recognition result accurately tracks the speaker's intent. A combination of both reference labels is also possible. A search-based error metric that relies on intuition-driven differences in search results may be used as a gold standard for an automated statistical classifier. The classifier may calculate multiple different error metrics during a training stage and combine those metrics in different ways to find a pattern that best approximates the gold standard error metric. For example the classifier may try to find linear regression coefficients $k\_1$ and $k\_2$ such that $k\_1*\text{diffinetric}\_1 + k\_2*\text{diffinetric}\_2$ is as close as possible the value of the error metric for each query.

Once trained, the statistical classifier may start receiving production queries for which an annotator's gold standard error metric is not available. The classifier may take the distance metrics and attempt to predict what the annotator would provide as an error metric by taking learned patterns, such as that illustrated above with the optimized $k\_1$ and $k\_2$, substituting values of the difference metrics, and computing the weighted sum to get the desired prediction.

Figure 1:
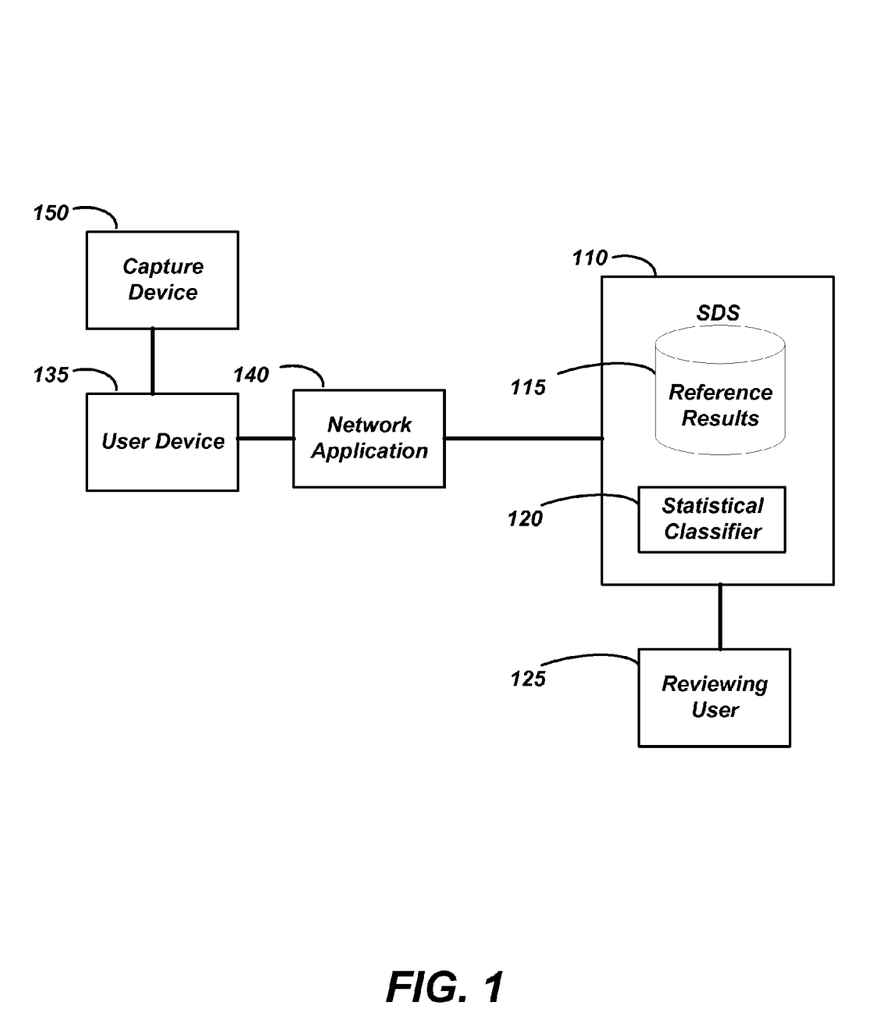
FIG. 1 is a block diagram of an operating environment.

FIG. 1 is a block diagram of an operating environment 100 for providing a semantic error rate metric comprising a spoken dialog system (SDS) 110. SDS 110 may comprise a reference results database 115 and a statistical classifier 120. SDS 110 may be operative to interact with a network application 140, such as a web search engine, and/or a user device 135. User device 135 may comprise an electronic communications device such as a computer, laptop, cellular and/or IP phone, tablet, game console and/or other device. User device 135 may be coupled to a capture device 150 that may be operative to record a user and capture spoken words, motions and/or gestures made by the user, such as with a camera and/or microphone. User device 135 may be further operative to capture other inputs from the user such as by a keyboard, touchscreen and/or mouse (not pictured). Consistent with embodiments of the invention, capture device 150 may comprise any speech and/or motion detection device capable of detecting the speech and/or actions of the user. For example, capture device 150 may comprise a Microsoft® Kinect® motion capture device comprising a plurality of cameras and a plurality of microphones.

Figure 2:
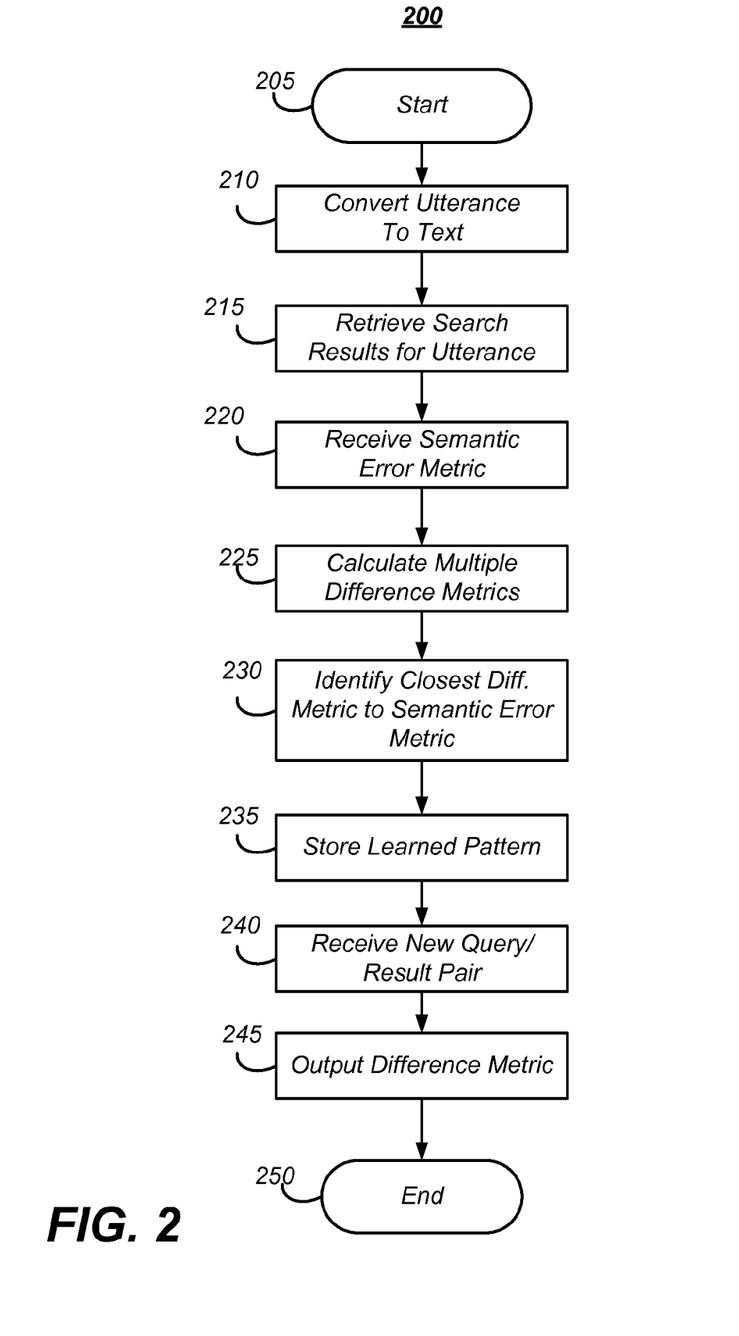
FIG. 2 is a flow chart of a method for providing statistical classifier training.

FIG. 2 is a flow chart setting forth the general stages involved in a method 200 consistent with an embodiment of the invention for training a statistical classifier. Method 200 may be implemented using a computing device 300 as described in more detail below with respect to FIG. 3. Ways to implement the stages of method 200 will be described in greater detail below. Method 200 may begin at starting block 205 and proceed to stage 210 where computing device 300 may convert an utterance to text. For example, capture device 150 may detect speech from the user via a microphone. SDS 110 may use a speech recognition hypothesis to convert the spoken utterance to a text-based representation.

Method 200 may then advance to stage 215 where computing device 300 may retrieve results associated with executing the converted text as a search query. For example, the query may be provided to network application 140, which may comprise a web search engine. The web search engine may return a ranked set of results according to the converted query text. Statistical classifier may also receive a second plurality of results, such as from reference results database 115, associated with a second conversion of the utterance to text. The second conversion may comprise, for example, a transcription by a human user and/or a second speech recognition hypothesis.

Method 200 may then advance to stage 220 where computing device 300 may receive a semantic error metric from a reviewing user. For example, a human annotator may compare the results from the executed search query with the set of reference results to determine whether the two sets of results are similarly useful. The human annotator may, for example, determine that reference results associated with the query "home depot" and search results from a recognition hypothesis resulting in query text of "the home depot" are almost identical and thus provide a semantic error rate for the recognition that is very low. In contrast, the reviewing user may determine that reference results for the "peace" and search results from a recognition hypothesis resulting in query text of "peas" are completely different, and thus the semantic error rate for this pair should be very high.

Method 200 may then advance to stage 225 where computing device 300 may compute a plurality of difference metrics between the two sets of results. For example, the difference metric may be expressed in terms of precision and/or recall metrics defined on paired sets (e.g., titles, summaries, and/or full contents) between the two result sets. The recall metric on titles, for example, may be computed as follows: For all titles of webpages in the set of search results for the query's reference results, determine whether a webpage with the same title occurs in the set of search results for the converted text. If so, a rank difference may be computed for this webpage in the two sets and normalized appropriately. These normalized rank difference may be summed up across all titles in the first set, weighting individual webpages according to their ranks in this set. To compute a precision metric, the two sets may be swapped. Similar measures may be produced at the word n-gram level for titles, summaries and/or full contents.

Method 200 may then advance to stage 230 where computing device 300 may identify which of the difference metrics most closely maps to the error metric. A statistical classifier (e.g., part of SDS 110) may attempt to map each of the difference metrics computed at stage 225 to the semantic error rate received at stage 220. As part of a training process, the classifier may be presented with a plurality of cases such as this. For each query, the classifier may learn that its set of difference metrics should result in a certain semantic error rate.

Method 200 may then advance to stage 235 where computing device 300 may store the difference metric calculation and/or combination of difference metric calculations as a learned pattern. For example, if statistical classifier 120 finds a correspondence between a difference metric calculation and a particular utterance, the classifier may learn this correspondence and how to generalize. The classifier may learn to produce the right semantic error rate estimate even for recognition/hypothesis result pairs that it has never seen before.

Method 200 may then advance to stage 240 where computing device 300 may receive a new query/result pair. For example, a new utterance may be received from a user and be converted to a text-based query via two different speech recognition hypotheses. Each converted query may be applied to a search engine application and paired with its respective set of results. Statistical classifier 120 may then use the learned pattern from stage 235 to estimate a semantic difference metric between the two result sets.

Method 200 may then advance to stage 245 where computing device 300 may output the estimated semantic difference metric. For example, statistical classifier may provide the calculated metric to a developer who is trying to determine which of two speech recognition hypotheses are more accurate. Method 200 may then end at stage 250.

An embodiment consistent with the invention may comprise a system for providing a semantic evaluation metric. The system may comprise a memory storage and a processing unit coupled to the memory storage. The processing unit may be operative to receive a spoken query from a user, convert the spoken query to text according to a first speech recognition hypothesis, receive a plurality of results associated with the converted query, and compare the plurality of results to a second plurality of results associated with the converted query.

Another embodiment consistent with the invention may comprise a system for providing a semantic evaluation metric. The system may comprise a memory storage and a processing unit coupled to the memory storage. The processing unit may be operative to receive an utterance from a user, convert the utterance to text according to a first speech recognition hypothesis, perform a search according to the converted text, receive a first plurality of results according to the search, and calculate a metric of difference between the first plurality of results and at least one second plurality of results.

Yet another embodiment consistent with the invention may comprise a system for providing a semantic evaluation metric. The system may comprise a memory storage and a processing unit coupled to the memory storage. The processing unit may be operative to train a statistical classifier associated with at least one speech recognition capable application. For example, the processing unit may receive a spoken phrase, convert the spoken phrase to a text query according to a first speech recognition hypothesis, execute the text query on a web search engine, receive a first plurality of results from the web search engine, receive, from a reviewing user, a semantic error rate metric associated with a comparison of the first plurality of results and a reference plurality of results, wherein the reference plurality of results is associated with an execution of a second conversion of the spoken phrase to a second text query, wherein the second conversion comprises a transcription of the spoken phrase by the reviewing user, identify a combination of a plurality of difference metrics between the first plurality of results and the second plurality of results that approximates the semantic error rate, and store the identified combination of the plurality of difference metrics as a learned accurate pattern. The processing unit may be further operative to receive, by the statistical classifier at least two query/result pairs from the at least one speech recognition capable application and estimate a semantic difference metric between the at least two query/result pairs according to the learned accurate pattern.

Figure 3:
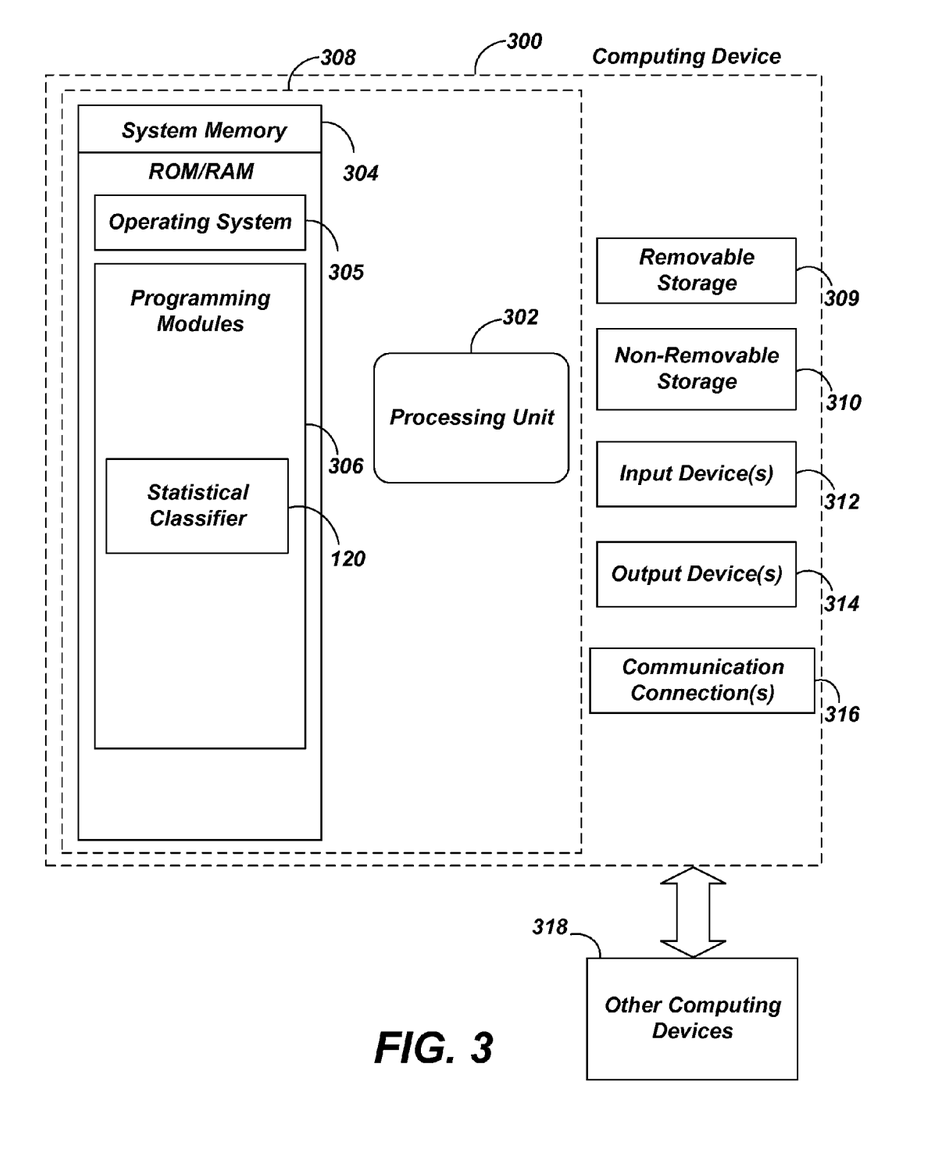
FIG. 3 is a block diagram of a computing device.

FIG. 3 is a block diagram of a system including computing device 300. Consistent with an embodiment of the invention, the aforementioned memory storage and processing unit may be implemented in a computing device, such as computing device 300 of FIG. 3. Any suitable combination of hardware, software, or firmware may be used to implement the memory storage and processing unit. For example, the memory storage and processing unit may be implemented with computing device 300 or any of other computing devices 318, in combination with computing device 300. The aforementioned system, device, and processors are examples and other systems, devices, and processors may comprise the aforementioned memory storage and processing unit, consistent with embodiments of the invention. Furthermore, computing device 300 may comprise operating environment 300 as described above. Methods described in this specification may operate in other environments and are not limited to computing device 300.

With reference to FIG. 3, a system consistent with an embodiment of the invention may include a computing device, such as computing device 300. In a basic configuration, computing device 300 may include at least one processing unit 302 and a system memory 304. Depending on the configuration and type of computing device, system memory 304 may comprise, but is not limited to, volatile (e.g. random access memory (RAM)), non-volatile (e.g. read-only memory (ROM)), flash memory, or any combination. System memory 304 may include operating system 305, one or more programming modules 306, and may include statistical classifier 120. Operating system 305, for example, may be suitable for controlling computing device 300's operation. Furthermore, embodiments of the invention may be practiced in conjunction with a graphics library, other operating systems, or any other application program and is not limited to any particular application or system. This basic configuration is illustrated in FIG. 3 by those components within a dashed line 308.

Computing device 300 may have additional features or functionality. For example, computing device 300 may also include additional data storage devices (removable and/or non-removable) such as, for example, magnetic disks, optical disks, or tape. Such additional storage is illustrated in FIG. 3 by a removable storage 309 and a non-removable storage 310. Computing device 300 may also contain a communication connection 316 that may allow device 300 to communicate with other computing devices 318, such as over a network in a distributed computing environment, for example, an intranet or the Internet. Communication connection 316 is one example of communication media.

The term computer readable media as used herein may include computer storage media. Computer storage media may include volatile and nonvolatile, removable and non-removable media implemented in any method or technology for storage of information, such as computer readable instructions, data structures, program modules, or other data. System memory 304, removable storage 309, and non-removable storage 310 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 300. Any such computer storage media may be part of device 300. Computing device 300 may also have input device(s) 312 such as a keyboard, a mouse, a pen, a sound input device, a touch input device, etc. Output device(s) 314 such as a display, speakers, a printer, etc. may also be included. The aforementioned devices are examples and others may be used.

The term computer readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

As stated above, a number of program modules and data files may be stored in system memory 304, including operating system 305. While executing on processing unit 302, programming modules 306 (e.g., statistical classifier 120) may perform processes and/or methods as described above. The aforementioned process is an example, and processing unit 302 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the invention may be practiced via a system-on-a-chip (SOC) where each or many of the components illustrated in FIG. 3 may be integrated onto a single integrated circuit. Such an SOC device may include one or more processing units, graphics units, communications units, system virtualization units and various application functionalities, all of which may be integrated (or "burned") onto the chip substrate as a single integrated circuit. When operating via an SOC, the functionality, described herein, with respect to training and/or interacting with SDS 110 may operate via application-specific logic integrated with other components of the computing device/system X on the single integrated circuit (chip).

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

All rights including copyrights in the code included herein are vested in and the property of the Applicants. The Applicants retain and reserve all rights in the code included herein, and grant permission to reproduce the material only in connection with reproduction of the granted patent and for no other purpose.

While certain embodiments of the invention have been described, other embodiments may exist. While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

We claim:

1. A method, implemented using a computing device, for providing a semantic evaluation metric, the method comprising:

receiving a spoken query from a user;

converting the spoken query to text according to a first speech recognition hypothesis;

receiving a first plurality of results, from a web search engine, associated with the first speech recognition hypothesis converted query;

converting the spoken query to text according to at least a second speech recognition hypothesis;

receiving a second plurality of results, from the web search engine, associated with the at least second speech recognition hypothesis converted query; and comparing the first plurality of results to a second plurality of results associated with the spoken query;

generating a semantic difference metric according to the comparison, wherein generating the semantic difference metric comprises:

for each of the results in the plurality of results, determining whether the result is present in the second plurality of results;

in response to determining that the result is present in the second plurality of results, determining whether a rank of the result is the same in the second plurality of results; and in response to determining that the rank of the result is not the same in the second plurality of results, increasing the semantic difference metric.

2. The method of claim 1, wherein the second plurality of results comprises at least one reference set of results.

3. The method of claim 2, wherein the at least one reference set of results comprises a set of results associated with a manual transcription of the spoken query.

4. The method of claim 2, wherein the at least one reference set of results comprises a set of results associated with a second speech recognition hypothesis.

5. The method of claim 1, wherein determining whether the result is present in the second plurality of results comprises determining if a web page title of the result is present in the second plurality of results.

6. The method of claim 1, wherein determining whether the result is present in the second plurality of results comprises determining whether a summary of the result is the same as a second summary of at least one result of the second plurality of results.

7. The method of claim 1, wherein determining whether the result is present in the second plurality of results comprises determining whether a plurality of content data of the result is the same as a second plurality of content data of at least one result of the second plurality of results.

8. The method of claim 1, further comprising applying a weighting criteria to the result proportional to the rank of the result.

9. A system for providing a semantic evaluation metric, the system comprising:
a memory storage; and
a processing unit coupled to the memory storage, wherein the processing unit is operable to:
receive an utterance from a user,
convert the utterance to text according to a first speech recognition hypothesis,
perform a first search according to the converted text,
receive a first plurality of results, from a web search engine, according to the first search,
convert the utterance to text according to a second speech recognition hypothesis,
perform a second search according to the converted text,
receive a second plurality of results, from a web search engine, according to the second search, and
calculate a semantic difference metric between the first plurality of results and the second plurality of results, wherein the difference metric provides a semantic error rate for the first speech recognition hypothesis and the second speech recognition hypothesis pair, and wherein being operative to calculate the different metric comprises:
for each of the results in the plurality of results, determine whether the result is present in the second plurality of results;
in response to being operate to determine that the result is present in the second plurality of results, determine whether a rank of the result is the same in the second plurality of results; and
in response to being operate to determine that the rank of the result is not the same in the second plurality of results, increase the semantic difference metric.

10. The system of claim 9, wherein the second plurality of results comprises a reference plurality of results associated with the utterance.

11. The system of claim 10, wherein the reference plurality of results comprises results obtained from a transcription of the utterance.

12. The system of claim 10, wherein the processing unit is further operative to receive a semantic error metric from a reviewing user, wherein the semantic error metric comprises an annotation by the reviewing user based on a comparison of the first plurality of results and the reference plurality of results.

13. The system of claim 12, wherein the processing unit is further operative to calculate a plurality of difference metrics between the first plurality of results and the reference plurality of results.

14. The system of claim 13, wherein the processing unit is further operative to identify a combination of the plurality of difference metrics that comprises an approximation of the semantic error metric.

15. The system of claim 14, wherein the processing unit is further operative to store the identified combination of the plurality of difference metrics as a learned pattern for approximating the semantic error metric.

16. The system of claim 15, wherein the processing unit is further operative to:
receive at least two result sets; and
estimate a new difference metric between the two result sets according to the learned pattern.

17. The system of claim 9, wherein being operative to calculate the difference metric comprises:
being operative to compute a rank difference between each of the results of the first plurality of results and each of a corresponding result of the second plurality of results; and
being operative to normalize each of the computed rank differences according to a weighting associated with each result of the second plurality of results.

18. A computer storage device which stores a set of instructions which, when executed, performs a method for providing a semantic evaluation metric, the method executed by the set of instructions comprising:
training a statistical classifier associated with at least one speech recognition capable application, wherein training the statistical classifier comprises:
receiving a spoken phrase,
converting the spoken phrase to a text query according to a first speech recognition hypothesis,
executing the text query on a web search engine,
receiving a first plurality of results from the web search engine,
receiving, from a reviewing user, a semantic error rate metric associated with a comparison of the first plurality of results and a reference plurality of results, wherein the reference plurality of results is associated with an execution of a second conversion of the spoken phrase to a second text query, wherein the second conversion comprises a transcription of the spoken phrase by the reviewing user,
identifying a combination of a plurality of difference metrics between the first plurality of results and the second plurality of results that approximates the semantic error rate, and
storing the identified combination of the plurality of difference metrics as a learned pattern for approximating the semantic error rate;
receiving, by the statistical classifier at least two query/result pairs from the at least one speech recognition capable application, wherein each of the at least two query/result pairs comprise a converted query associated with a spoken phrase received from a user of the at least one speech recognition capable application and wherein each of the converted queries resulted from a different speech conversion basis; and estimating a semantic difference metric between the at least two query/result pairs according to the learned pattern.

19. The method of claim 1, further comprising receiving a semantic error metric from a reviewing user, wherein the semantic error metric comprises an annotation by the reviewing user based on a comparison of the first plurality of results and the reference plurality of results.

20. The method of claim 19, further comprising calculating a plurality of difference metrics between the first plurality of results and the reference plurality of results.

* * * * *